United States Patent
Sinnl

[19]

[11] Patent Number: 6,024,421

[45] Date of Patent: Feb. 15, 2000

[54] MEDIA DIVIDER FOR VEHICLE HYDRAULIC BRAKE SYSTEMS

[75] Inventor: Erwin Sinnl, Meimsheim, Germany

[73] Assignee: Robert Bosch GmbH, Stuttgart, Germany

[21] Appl. No.: 08/991,008

[22] Filed: Dec. 15, 1997

[30] Foreign Application Priority Data

Dec. 13, 1996 [DE] Germany .......................... 196 51 842

[51] Int. Cl.$^7$ ...................................................... B60T 8/42
[52] U.S. Cl. .................................. 303/115.1; 303/DIG. 11
[58] Field of Search .............................. 303/115.1, 115.4, 303/84.2, 84.1, DIG. 11

[56] References Cited

U.S. PATENT DOCUMENTS 4,311,345 1/1982 Schopper ................................. 303/84.2
4,422,694 12/1983 Schopper et al. ...................... 303/84.2

FOREIGN PATENT DOCUMENTS 41 04 504 A1 8/1992 Germany .
42 02 905 A1 8/1993 Germany .

*Primary Examiner*—Robert J. Oberleitner
*Assistant Examiner*—Melanie Talavera
*Attorney, Agent, or Firm*—Edwin E. Greigg; Ronald E. Greigg

[57] ABSTRACT

A media divider has a divider piston, which is received in a cylinder bore and embodied as a tubular deep-drawn part. Two pairs of a sealing ring and an annular guide part disposed side by side are provided, whose axial spacing is defined by at least one spacer bushing disposed coaxially with the divider piston. The two pairs comprising the sealing ring and guide part as well as the spacer bushing may be axially fixed either in the cylinder bore or on the divider piston. The media divider may be used in the form of a plunger or as a reservoir in a fluid-carrying brake system.

6 Claims, 1 Drawing Sheet

MEDIA DIVIDER FOR VEHICLE HYDRAULIC BRAKE SYSTEMS

BACKGROUND OF THE INVENTION

The invention is based on a media divider for a vehicle hydraulic brake system.

One such media divider is already known (German Patent Disclosure DE 42 02 905 A1). Its divider piston comprises a tubular deep-drawn steel part, which is enveloped form-fittingly or force-lockingly on its circumference and face end by a guide part. The guide part receives a sealing ring in a circumferential groove. The injection-molded guide part is relatively expensive to produce and requires a material with a low coefficient of linear thermal expansion, in order to preserve the intimate connection with the steel deep-drawn part.

German Patent Disclosure DE 41 04 504 A1 also discloses a media divider with a divider piston of metal, which is in solid form and is provided with spaced-apart circumferential grooves made by metal-cutting machining, between which an encompassing constriction of the piston body is located. In a circumferential groove, a sealing ring is received on the inside and a guide ring on the outside in a radial arrangement, while in She other circumferential groove only a sealing ring is received. This divider piston is expensive to produce, is relatively high in weight, and when installed standing on its head in a cylinder bore can cause deficient function with regard to the sealing action.

OBJECT AND SUMMARY OF THE INVENTION

The media divider of the invention has the advantage over the prior art that the divider piston is low in weight, the sealing rings and guide parts can be mounted without essential widening, and are fixed axially in a simple way with the spacer bushing, and moreover an equally high sealing action is provided on both sides of the divider piston.

With the provisions recited here in, the aforementioned sealing, guide and spacing means can advantageously be secured in stationary fashion with regard to the divider piston, or on the divider piston itself.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
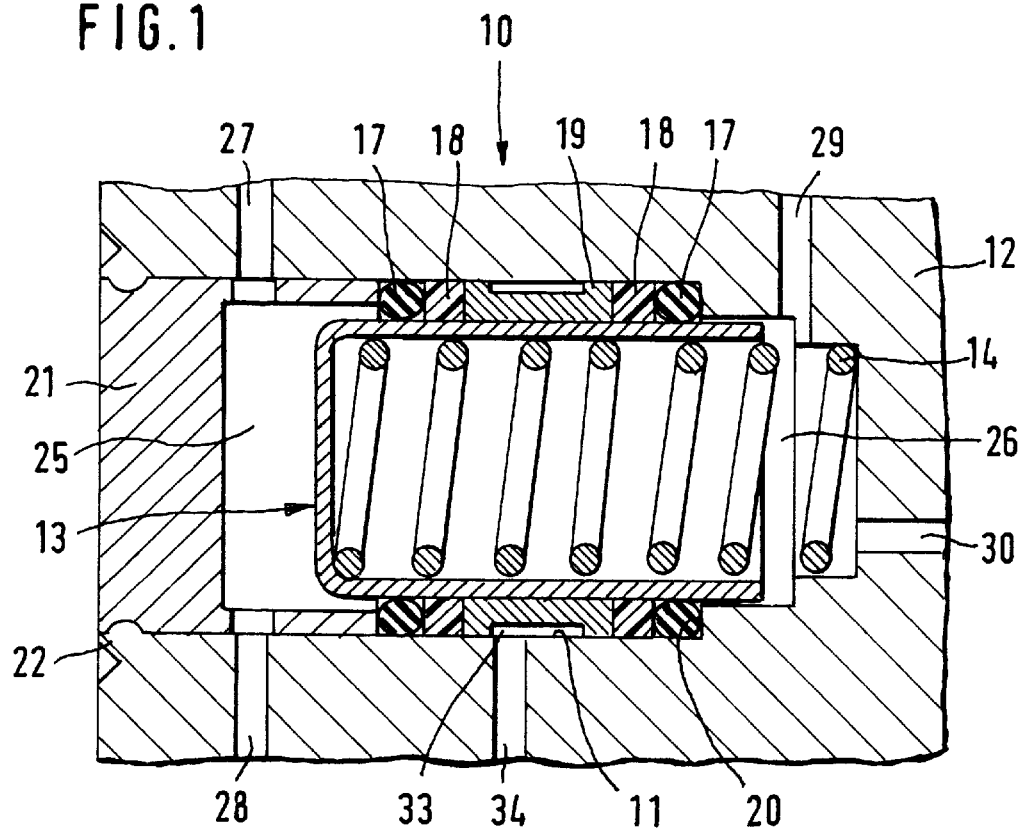
FIG. 1, in longitudinal section, shows a media divider with a divider piston and with sealing, guide and spacer means disposed stationary, as the first exemplary embodiment.

A media divider 10, shown in FIG. 1 as the first exemplary embodiment, has a stepped cylinder bore 11 in a housing block 12. Located in the cylinder bore 11 is a divider piston 13, which is embodied as a tubular deep-drawn sheet steel part. A compression spring 14 is received in the divider piston 13.

Located in the cylinder bore 11 are two pairs each including one elastomer sealing ring 17 and one annular guide part 18 made of a wear-resistant plastic. The two pairs each of a sealing ring 17 and a guide part 18 are disposed with axial spacing by means of a spacer bushing 19 of plastic or metal, which is received coaxially to the divider piston 13 in the cylinder bore 11. The two pairs each of one sealing ring 17 and one guide part 18, and the spacer bushings 19, are fixed axially in the cylinder bore 11, specifically on the one hand by means of a bore shoulder 20 and on the other by means of a closure cap 21 of the cylinder bore 11. The closure cap 21 is secured in the housing block 12 with a caulked connection 22; it seals off the cylinder bore 11 from the outside, optionally with the use of a sealing ring, not shown.

The divider piston 13 is axially displaceable in the cylinder bore 11. It divides two cylinder chambers 25 and 26 from one another. The cylinder chamber 25 communicates with lines 27, 28, and lines 29, 30 are connected to the cylinder chamber 26. Media, such as pressure fluid from separate supply circuits of a hydraulic motor vehicle brake system, can be supplied to and removed from the cylinder chambers 25 and 26, which are of variable volume as a result of displacement of the divider piston 13. A medium that for instance because of wear of the sealing rings 17 gets into the portion of the cylinder bore 11 occupied by the spacer bushing 19 is received by a leakage chamber 33 embodied circumferentially on the spacer bushing and carried away through a leakage line 34.

The media divider 10 according to the invention may be is used as a plunger, in order by feeding in pressure, for instance into the cylinder chamber 25, to expel medium from the cylinder chamber 26. Moreover, the media divider 10 can serve as a reservoir for a liquid or gaseous medium introduced into the cylinder chamber 25, while the cylinder chamber 26 likewise contains a gas or communicates with the atmosphere.

Figure 2:
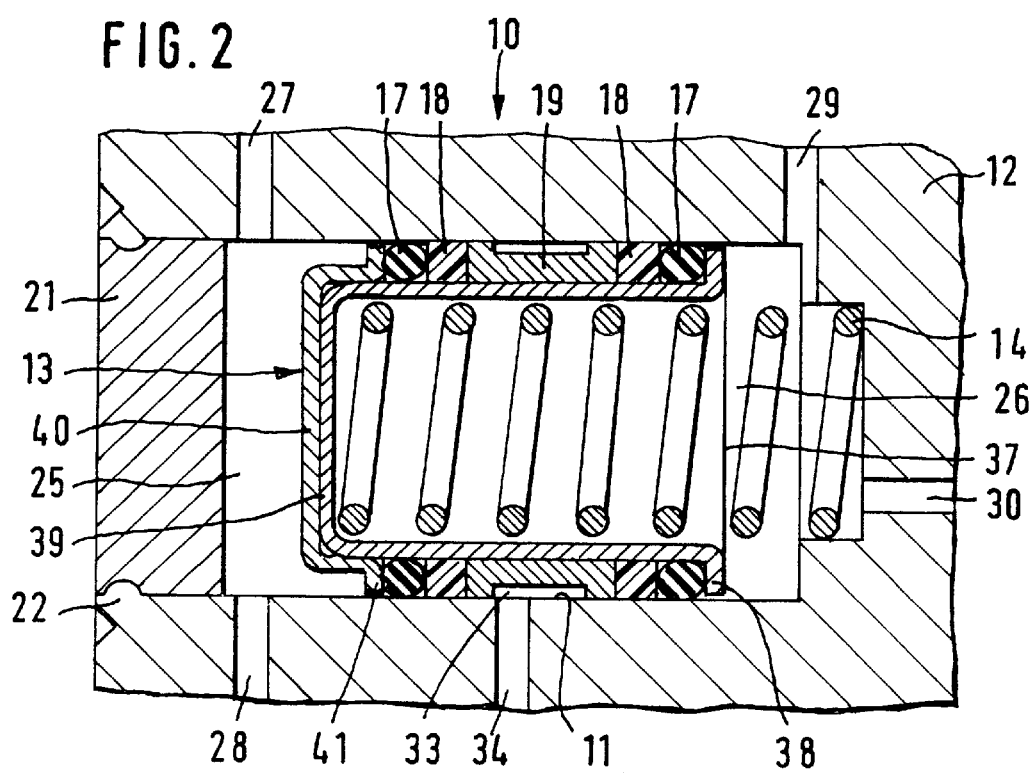
FIG. 2, again in longitudinal section, shows a media divider with the aforementioned means on a divider piston, as the second exemplary embodiment.

The second exemplary embodiment of the media divider 10, shown in FIG. 2 of the drawing, differs from the first exemplary embodiment in that the pairs of a side by side sealing ring 17 and guide part 18, and the spacer bushing 19, are all axially fixed on the divider piston 13. To that end, this piston, on its end, 37 toward the mouth, has an outward-pointing flange 38, while a caplike tube 40, deep drawn from sheet steel and having a flange 41, is mounted on the bottom portion 39 of the divider piston 13. The divider piston 13 and the tube 40 are joined together by force locking or material locking, for instance. The two pairs each of a sealing ring 17 and guide part 18 with the spacer bushing 19 located between them, are secured in the same arrangement as in the first exemplary embodiment, between the two flanges 38 and 41 of the divider piston 13 and tube 40. While in the exemplary embodiment of FIG. 1 the divider piston 13 serves as a slide face on its circumference, in the exemplary embodiment of FIG. 2 the cylinder bore 11 is the face on which the sealing rings 17 and the guide parts 18 slide upon a displacement of the divider piston 13.

In a departure from the exemplary embodiments in which the sealing ring 17 is shown as a round ring, sealing rings of some other form, such as shaped rings (lip rings) may also be used.

The foregoing relates to preferred exemplary embodiments of the invention, it being understood that other variants and embodiments thereof are possible within the spirit and scope of the invention, the latter being defined by the appended claims.

I claim:

1. A media divider (10) for vehicle hydraulic brake systems, comprising a divider piston (13), received in a cylinder bore (11) and embodied as a tubular deep-drawn part, at least one guide part (18) for guiding the divider piston (13) in the cylinder bore (11), and at least one sealing ring (17) for circumferentially sealing off the divider piston (13) in the cylinder bore (11), a first and second pair of a side-by-side sealing ring (17) and an annular guide part 18, each of said first and second pairs surround said divider piston and an axial spacing between said first and second pairs is determined by at least one spacer bushing (19) disposed coaxially with the divider piston (13).

2. A media divider in accordance with claim 1, in which the first and second pairs of the sealing ring (17) and annular guide part (18) as well as the spacer bushing (19) are axially fixed in the cylinder bore (11).

3. A media divider in accordance with claim 2, in which the first and second pairs of the sealing ring (17) and annular guide part (18) as well as the spacer bushing (19) are disposed between a bore shoulder (20) and a closure cap (21) of the cylinder bore (11).

4. A media divider in accordance with claim 1, in which the first and second pairs of the sealing ring (17) and annular guide part (18) as well as the spacer bushing (19) are axially fixed on the divider piston (13).

5. A media divider in accordance with claim 4, in which the first and second pairs of the sealing ring (17) and annular guide part (18) as well as the spacer bushing (19) are disposed between a flange (38, 41) on a discharge end (37) of the divider piston (13) and on a caplike tube (40), which is received coaxially on a bottom portion (39) of the divider piston (13).

6. A media divider in accordance with claim 5, in which the divider piston (13) and the tube (40) are joined together by force-locking or material-locking.

* * * * *